July 14, 1959  A. E. CARLE  2,894,405
VARIABLE SPEED TRANSMISSION
Filed May 14, 1956  2 Sheets-Sheet 1
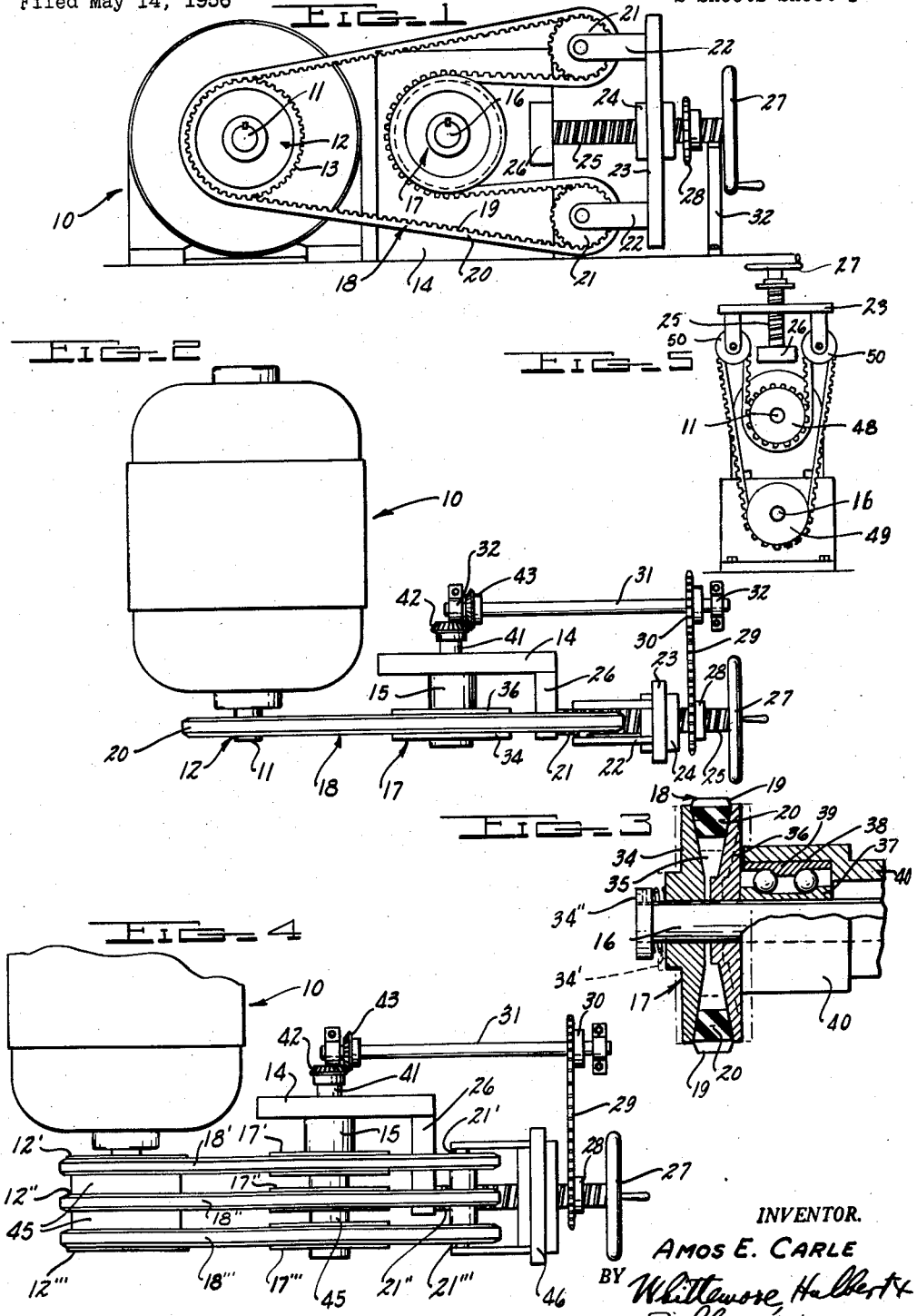
INVENTOR.
AMOS E. CARLE
BY Whittemore, Hulbert &
Belknap
ATTORNEYS

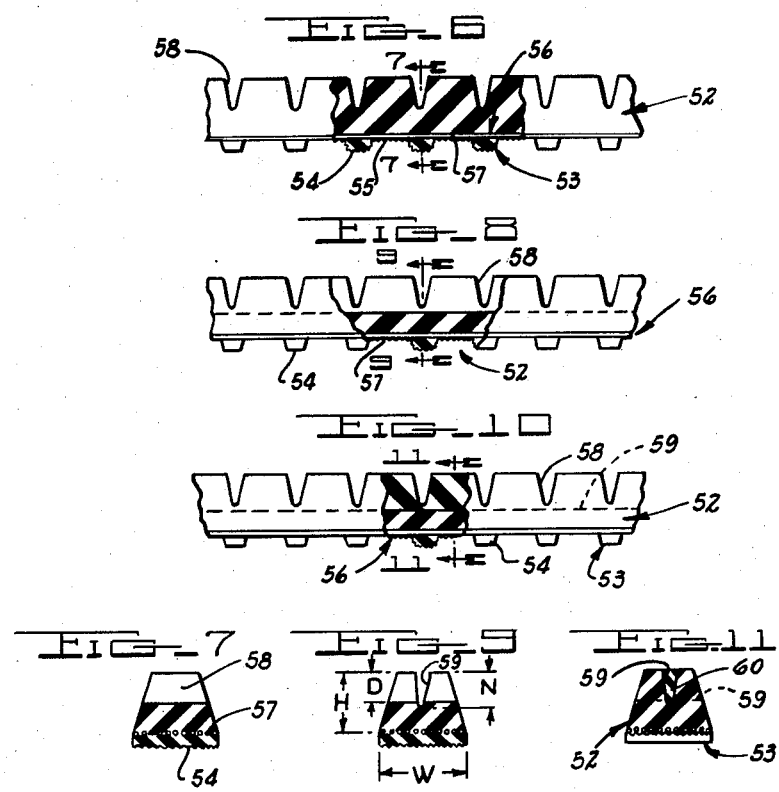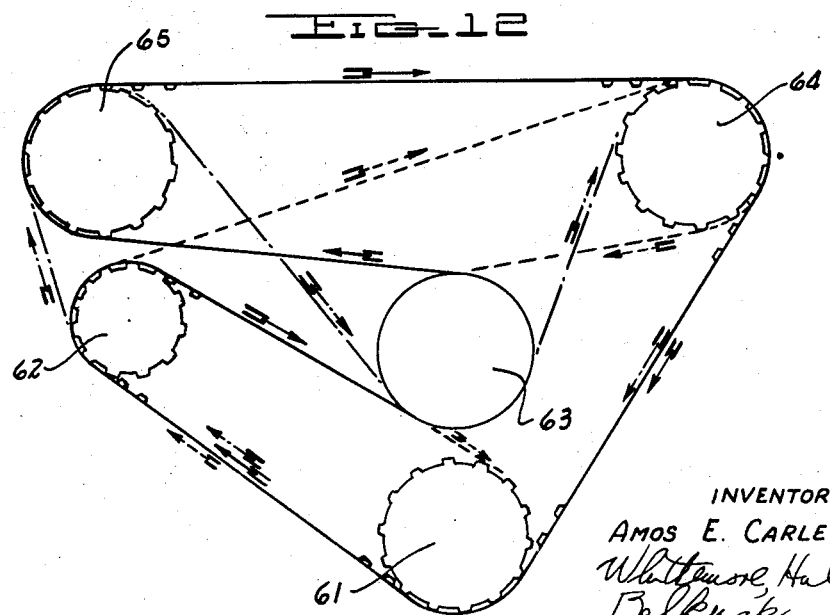

United States Patent Office 2,894,405
Patented July 14, 1959

2,894,405
VARIABLE SPEED TRANSMISSION
Amos E. Carle, Detroit, Mich.
Application May 14, 1956, Serial No. 584,858
2 Claims. (Cl. 74—230.17)

The present invention relates to the variable speed transmission of mechanical power by an improved belt and pulley arrangement coupling a rotary prime mover with a driven shaft.

An inherent draw-back in existing belt power transmission units or systems, whether of variable or fixed speed ratio, stems from the limitation imposed by belt slippage, particularly at the driving sheave or pulley. While a variable speed belt-pulley unit is versatile in regard to available output speeds in any of a wide varety of units available to the trade, which may be of the stepped ratio or the stepless, or infinite variation types, still the factor of belt slippage, particularly at low speeds, materially limits the desirability of this type of power transmission for many uses. The horsepower transmitted always decreases as speed decreases, and in a constant center unit in particular the slippage of a standard V-belt at the driving and driven pulleys occasions a substantial loss of efficiency at low speed.

It is therefore a general object of the invention to provide an improved variable speed belt power transmission unit in which the limitation imposed by belt slippage is materially reduced, and in which there is provision for positive driving at the prime mover.

More particularly, it is an object to provide an improved variable speed belt transmission including a composite endless belt having inner and outer driving surface portions of different type, one presenting a smooth friction drive surface of V-shaped external contour and the other presenting a positive drive surface which is toothed in the manner of a timing belt, and being engaged with an appropriate correspondingly toothed pulley or sheave. In accordance with the invention, a smooth surfaced pulley engaged by the first mentioned belt drive surface is the driven or output pulley and has provisions to vary its pitch diameter, thus to selectively adjust the speed ratio.

Another object of the invention is to provide an improved transmission unit of the sort referred to, in which one of the two belt surfaces, preferably the V-belt friction driving portion, is engaged with its pulley (i.e. the variable pitch pulley) adjustably mounted by the use of idlers. The speed ratio of the unit may be varied as desired during the operation thereof, while preserving the advantages of the positive, timing belt drive at the power input or driving shaft.

Still another object of the invention is to provide an improved belt power transmission unit as described wherein the provisions for adjusting the pitch of the friction driven pulley are mechanically coupled with provisions for automatically compensating change in belt tension such as normally accompany changes in pulley pitch diameter. More specifically, this involves the provision of a movable mount for the idlers about which the belt is trained in order to properly engage its smooth V-friction surface with the variable pitch pulley, together with an actuator for bodily shifting this mount as the pitch of the pulley is varied. Thus a widening of the pulley is attended by a shifting of the idlers in a direction to maintain continuing uniform contact pressure between the belt and pulley flanges as the widening takes place. There is no possibility of slippage as the speed ratio is changed, and no interruption of the continuity of transmission of power.

It is a further object of the invention to provide an improved power transmission belt of general utility, though also well adapted for use in a transmission unit as described above, which belt has opposed V and toothed or timing driving portions joined to one another along the dedendum line of the teeth of the latter, i.e. the line substantially coinciding with the base or bottom of the spaces between the belt teeth, as engaged by the crests of the pulley teeth when the belt is trained therearound. In accordance with the improvement in this respect, the V-belt portion of the improved belt is provided with transverse notches extending toward the dedendum line, the notches being spaced along the length of the belt to occur opposite the teeth of the toothed or timing belt portion of the belt.

Yet another and more specific object is to provide an improved belt of this sort in which there is a transverse V-belt notch as described opposing each tooth of the timing belt portion.

In accordance with a still further object, the V-driving portion of the improved belt is provided with a continuous elongated cleft intermediate its side frictional driving surfaces and extending well in toward the dedendum line of the timing belt portion, for the purpose of preventing undue bulging of the side driving surfaces under load and to shift the load toward the pitch line of the pulley.

Another object of the invention is to provide a combined timing and V-belt construction featuring a longitudinal cleft or groove as described, which is wholly or partly filled in as determined by the nature of the installation with a harder or softer material than that of the V-portion itself.

The foregoing as well as other objects will be made more apparent as this description proceeds, especially when considered in connection with the accompanying drawings, wherein:

Fig. 1 is a side elevational view, more or less schematic in character, of one embodiment of the improved belt transmission unit according to the invention;

Fig. 2 is a top plan view of the unit of Fig. 1;

Fig. 3 is a fragmentary enlarged view, partially broken away and in axial section, through a typical actuator to control pulley pitch diameter, as incorporated in the transmission unit of Figs. 1 and 2;

Fig. 4 is a fragmentary top plan view of a multiple pulley installation in accordance with a modified embodiment of the invention;

Fig. 5 is a schematic side elevational view of another modification of the invention;

Fig. 6 is a fragmentary view partially in central longitudinal section through an improved transmission belt combining V and toothed or timing belt portions in accordance with a refinement of the invention;

Fig. 7 is a view in transverse vertical section along line 7—7 of Fig. 6;

Figs. 8 and 9 are, respectively, sectional views similar to Figs. 6 and 7, showing a modification;

Figs. 10 and 11 are further sectional views corresponding to Figs. 6 and 7, respectively, illustrating a further modification; and Fig. 12 is a schematic view illustrating the application of the improved belt in different typical automotive power transmission systems.

Referring first to Figs. 1 and 2 of the drawings, reference numeral 10 generally designates the prime mover of the improved power transmission, which is illustrated as an electric motor of appropriate rating. The shaft 11 of motor 10 has keyed thereon a driving pulley or sheave 12 which is milled transversely around its periphery to provide positive driving teeth 13 of equal width and circumferential spacing.

The reference numeral 14 designates a conventional fixed mount or bracket, which may take the form of a rigidly supported plate, and this plate is provided with a hollow, laterally extending hub or boss 15 which receives a shaft 16 on which the output pulley 17 of the unit is driven.

The power transmission belt of the improved unit is generally designated 18. It is an endless one and its cross sectional contour is illustrated in Fig. 3. It is provided around its inner perimeter with a continuous series of driving teeth 19 of the sort characteristic of a timing belt, these teeth being proportioned in size and spacing to have driving engagement without lost motion with the teeth 13 of the pulley 12. The individual teeth 19 are flat and extend across the entire width of the belt 18 at the inner perimetral portion of the latter.

The outer perimetral portion of belt 18 is smooth and of a V-shaped cross section. Belt 18 may be appropriately reinforced in any desired manner, as by embedding endless strands in and around the length of the V portion 20 and/or embedding approximate transverse enforcing elements in the teeth 19.

Again referring to Fig. 1, a pair of idler pulleys 21 are employed to hold the composite belt 18 in continuous driving engagement with the driven or output pulley 17, the smooth V-friction surface 20 being in frictional engagement with the groove of variable pitch output pulley 17 and the belt timing teeth 19 having positive driving engagement with driver pulley 12. The idlers 21, which are shown as toothed to cooperate with the teeth 19, but which may be smooth surfaced, if desired, are journaled in forked arms 22 on an adjustable transverse yoke bar 23 in the plane of the respective driving and driven pulley 12, 17. Bar 23 carries an internally threaded hub or nut member 24, and this nut member threadedly receives an elongated adjusting screw 25, the inner end of which is appropriately journaled and held from longitudinal movement in a rigid, lateral projecting bracket 26 on the mounting plate 14. The outer end of screw 25 has a handwheel 27 secured thereon, by which the screw may be rotated in either direction and, in so rotating, shift the idler pulleys 21 to the right or left as viewed in Figs. 1 and 2.

A sprocket 28 is fixedly secured on an adjusting screw 25, being located inwardly of handwheel 27 and sufficiently outwardly of cross yoke 23 as not to obstruct outward movement of the latter; and a chain 29 trained about sprocket 28 drivingly connects the latter and the adjusting screw 25 with a further sprocket 30 secured on a counter shaft 31. Counter shaft 31 is suitably journaled at its ends by upright bearing supports 32, which positions the shaft in the horizontal plane of the output shaft 16 on which variable pitch pulley 17 is carried.

Appropriate provisions are made to adjust the width of the pulley 17 in stepless increments, and the arrangement suggested in Fig. 3 of the drawings is a typical one. As there shown, the pulley 17 comprises an outer disk or flange 34 biased inwardly by a coil spring 34' abutting a stop collar 34" secured to the output shaft 16. Flange 34 has a smooth, inwardly coned friction driving face 35, as does a similar coacting, axially adjustable flange 36 of the pulley 17. The V-portion 20 of belt 18 runs between these flanges in the usual fashion at a greater or lesser pitch diameter, as illustrated in solid and dotted lines, respectively, in Fig. 3.

Pulley flanges 34 and 36 are splined for axial shifting movement on shaft 16, as is also the inner race 37 of a ball bearing 38 against which the pulley flange 36 axially abuts, the pulley flanges and race rotating with shaft 16. The outer race 39 of bearing 38 is fixedly telescoped in an adjusting sleeve 40, the outer race and sleeve being out of contact with pulley flange 36. The operation of the described adjusting provisions is conventional, the pulley flanges 34 and 36 separating and coming together to vary the pitch line while keeping the belt 18 on a constant center axially of the pulley.

Other types of actuators for variable pitch pulley 17 may be employed, since details of this sort do not constitute a part of the invention. In the arrangement shown, the actuator sleeve 40 preferably derives its axial movement, while being restrained against rotation, through a threaded inter-engagement with a rotatable adjusting member 41 journaled on mounting plate 14. The member 41 carries a bevel gear 42 which meshes with a bevel gear 43 secured on counter shaft 31. Thus it is seen that, as the counter shaft 31 is rotated to adjust the width of pulley 17 through the provisions just described, the attendant rotation of adjusting screw 25 causes the nut 24 on cross yoke 23 to run in or out on screw 25 and correspondingly convey the toothed idlers 21.

A decrease in the width of pulley 17 results in an inward shift of the idlers 21 to afford additional belt length at the pulley wrap, and vice versa, the belt pressure at both pulleys 12, 17 remaining constant during the change.

A modified adaptation of the invention in multiple pulley or sheave units is illustrated in Figure 4. The structure and principles involved are the same as those described in connection with Figures 1, 2 and 3, save that power capacity is increased by the employment of a plurality of driver pulleys or sheaves 12', 12" and 12''', appropriately spaced axially from one another by spacer sleeves 45, a plurality of driven pulleys or sheaves 17', 17" and 17''', similarly spaced, corresponding sets of idler pulleys 21', 21" and belts 18', 18" and 18''', all identical to the composite belt 18 of the first form. Naturally, the cross yoke device 46 for a multiple sheave installation of this type will be approximately modified in an obvious manner. In other respects, the structural features of the installation of Figure 4 are identical to those of Figures 1, 2 and 3 and are accordingly designated by like reference numerals. Further description thereof may be dispensed with.

Belt transmission units as above described are capable of transmitting substantially greater horsepower than known variable pitch units employing belts of equivalent size but, for example, of conventional friction V-belt construction. The positive driving of the belt 18 at the shaft of motor 10 by reliable anti-slip engagement of the timing belt portion and pulley teeth 13, combined with the constant pressure friction exerted on variable pitch pulley 17 at the output (after the belt wrap is reversed by idlers 21 to enable the pulleys 12, 17 to engage, respectively, the toothed and smooth belt portions 19, 20 on correspondingly oriented arcuate portions of those pulleys) represents maximum ability to transmit torque by belt, coupled with infinite-variation ratio adjustability and maintenance of constant, non-slip belt-pulley pressure at the output shaft. These advantages are had in any adjustment of the pulley 17 and without interruption of power transmission during adjustment.

Since in the improved unit only a single pulley pitch diameter is altered, as distinguished from a constant center type of variable pitch power transmission unit, in which the pitch diameters of the driving and driven pulleys vary inversely, the degree of belt wrap is substantially constant in the improved unit. Hence, the factor of differing belt wrap is cancelled out as a source of discrepancy as to the power transmitted by the unit at different speeds. The idlers 21 fix the extent of arcuate engagement of belt 18 with the pulleys as a substantially constant factor.

It has been found that with an installation as shown in the drawings, friction losses and losses due to belt slippage are substantially reduced. The speed at the driven shaft is the sole limitation on the efficiency of power transmission of the unit. In this regard, whereas a speed of about 1000 feet per minute is the practical lower speed limit for a conventional V-belt transmission, the unit of the invention retains high efficiency at substantially lower speeds. Actually, it has an unusually high efficiency as a power transmission unit, and at low speeds it will transmit power much better than a conventional variable speed power transmission belt device of the sort referred to.

A modification of the invention is shown in Fig. 5, in which the driving shaft 11 and output shaft 16 are in a common vertical plane as distinguished from their horizontal arrangement in the other two forms; and in which V-belt or plain pulleys are employed as the idlers.

As shown in Fig. 5, a positive drive, toothed or timing type pulley 48 is fixed on the motor actuated driving shaft 11 and, as in the first embodiments, a friction V-belt pulley 49 is applied to the driven shaft 16. However, in this case drive pulley 48 is located between pulley 49 and the idlers 50, so that the latter may also be the V-belt type, frictionally engaged by the V-belt portion 20 of a belt 18 similar to that of Figs. 1 through 4. Only the driver 48 is engaged by the positive drive teeth 19 of belt 18. An important advantage of this arrangement is that only one of the relatively more expensive timing belt pulleys is required.

All other provisions of the unit of Fig. 5, i.e., for adjusting the width of pulley 48 conjointly with the bodily adjustment of idlers 50, etc., are similar to what is shown in the other figures. Accordingly, corresponding reference numerals are employed to designate corresponding parts.

My co-pending application, Serial No. 490,885, filed February 28, 1955, now Patent 2,831,359, and entitled "Belting" discloses improved endless belt constructions which are adapted for use in a transmission as described above. Referring to Figs. 6 through 11, still further improvements and refinements in an endless belt are shown in three different embodiments according to the present invention.

In each of these a composite belt is formed of a friction driving portion 52 having a truncated triangular or generally V-shaped external outline and in opposed, back-to-back relation to this portion a toothed or timing portion 53, the longitudinally spaced teeth 54 of which are clothed with a wear resisting fabric 55. A strain resistant portion 56 which is substantially inextensible in the longitudinal sense is bonded between the frictional and toothed or timing portions 52, substantially at the dedendum line of the latter, i.e., the line at which the timing belt portion 53 is wrapped around the crests of the driving teeth of an associated pulley and coinciding substantially with the bottoms of the spaces between the teeth 54. The strain resistant member or portion 56 may be formed of cords, wires, as designated 57, of glass fibers or any other material which is substantially flat and flexible, and may be incorporated in the rubber material of the belt portions 52, 53 so as to undergo no significant elongation under tensional load in operation.

In accordance with the present improvement, the V-belt or frictional timing portion 52 is provided with transverse notches 58 extending thereacross and partially, in respect to depth, toward the strain resistant member 56 at the timing belt dedendum line. These notches are, in the main, in longitudinal alignment or register with teeth 54 of the timing belt portion being, in the main, in longitudinally coinciding relation with the midpoints of the respective teeth. Some variations may exist in this respect, however, by far the great majority of the notches are centered thusly, in order to impart desired flexibility to the belt in rounding a small diameter pulley, without unduly detracting from its power transmitting strength. The transverse notches 58 are common to the three forms shown in Figs. 6 and 7, in Figs. 8 and 9, and in Figs. 10 and 11.

As embodied in the belt of Figs. 6 and 7, the V- driving portion 52 is transversely continuous thereacross, i.e., from inclined side to inclined side thereof. In the embodiment illustrated in Figs. 8 and 9, the friction drive portion 52 is further provided with aligned longitudinal notches or clefts 59 between the sides thereof. The line of notches 59 is transversely centered in respect to the V-outline of the belt portion and, as illustrated in Fig. 9, is of slightly greater depth than the transverse notches 58 which it intersects. In general, the depth of the longitudinal slot will be in the neighborhood of 60% of the radial dimension of the V-portion 52, designated "H" in Fig. 9. The character "N" represents the depth of this longitudinal slot, whereas the character "D" represents the depth of the transverse slots 58, and the character "W" the width of the timing belt portion 53 of the construction.

For example, for belts of ¾ inch, 1 inch and 1½ inch widths, "W," the following table expresses corresponding measurements for the dimensions "H," "D" and "N," which are preferred to secure most efficient operation, always on the assumption of longitudinal coincidence of the notches 58 and timing belt teeth 54:

|   | Inches | | |
|---|---|---|---|
| W | ¾ | 1 | 1½ |
| H | ½ | ⅝ | 1 |
| D | ¼ | ⁵⁄₁₆ | ½ |
| N | ⁵⁄₁₆ | ⁷⁄₁₆ | ⅝ |

It is of course to be understood that the width of the respective notches 58, 59 will vary somewhat in accordance with the width and thickness of the belt as a whole, as well as the type of installation in which the belt is incorporated. It is preferred that these notches be of V-shaped outline, the taper of which will also vary in accordance with the installation.

It is the purpose of the line of longitudinal notches 59 to prevent or off-set the tendency of the inclined side driving surfaces of the V-portion 52 to bulge outwardly under load, thus objectionably concentrating wear. This control may be varied as desired, depending upon the circumstances encountered in operation, by partially or wholly filling in the notches 59, as illustrated in the form of the invention shown in Figs. 10 and 11. In this embodiment, the filler 60 will be of rubber or like flexible material similar to that of the remainder of the friction driving portion 52, but of harder or softer character, depending upon the degree of transverse bracing action to be afforded.

In general regard to the belt form of Figs. 6 through 11, a maximum of one transverse notch 58 per timing belt tooth 54, in transverse register therewith, is contemplated as a limit. This is the maximum number of notches required to give desired flexibility in passing over a small diameter pulley. Wear on the inclined sides of the V-portion 52 is concentrated relatively closely adjacent the dedendum line at the substantially inextensible member 56, hence the depth of the V-portion need not be as great as in a conventional V-belt construction. This signifies that the belt can be made more flexible with a shallower depth and thus wrap better around a small size pulley.

Fig. 12 of the drawings shows a typical automotive belt transmission system for an automobile, to which any of the forms of belt shown in Figs. 6 through 11 are admirably adapted. Thus, the crank shaft may have a toothed timing pulley 61 secured thereto and engaged by the timing belt portion 53 of the belt; a generator shaft may be similarly driven from a toothed, timing belt at 62; the fan frictionally driven through a conventional V-belt pulley 63; while a power steering pump shaft will be equipped with a toothed pulley 64 positively engaged by the belt portion 53.

Optionally, an air conditioning system may be powered from a pulley 65 which also has positive drive from the belt.

Fig. 12 shows, in solid and dot-dash line, the belt paths of two alternative arrangements employing all of the pulleys 61 through 65. The solid line arrangement in a typical installation requires 125 inches of belting; while the dot-dash arrangement required 104 inches. Omitting the optional air conditioning pulley 65, the arrangement may be as shown in dotted line, requiring approximately 85 inches.

The drawings and the foregoing specification constitute a description of the improved variable speed transmission and belt in such full, clear, concise and exact terms as to enable any person skilled in the art to practice the invention, the scope of which is indicated by the appended claims.

What I claim as my invention is:

1. A belt power transmission unit comprising spaced, substantially coplanar driving and driven pulleys, said driving pulley being provided with circumferentially spaced positive drive formations and said driven pulley being a variable pitch pulley having a relatively smooth circumferential drive surface, an endless belt trained about said pulleys to transmit power therebetween, said belt having opposed perimetral positive and frictional drive portions which are, respectively, in driving engagement on correspondingly oriented arcuate sides of pulleys with the drive formations and smooth drive surface of said respective pulleys, idler means about which said belt is trained to effect said belt and pulley engagements as described, and means to simultaneously adjust the pitch diameter of said variable pitch pulley and bodily shift said idler means in a direction to maintain constant belt pressure on the pulleys, said last named means comprising an adjustable mount for said idler means, a rotary actuator operatively connected to said variable pitch pulley to regulate the width thereof, and a mechanism interconnecting said mount and actuator for simultaneous adjustment.

2. A belt power transmission unit comprising spaced, substantially coplanar driving and driven pulleys, said driving pulley being provided with circumferentially spaced positive drive formations and said driven pulley being a varaible pitch pulley having a relatively smooth circumferential drive surface, an endless belt trained about said pulleys to transmit power therebetween, said belt having positive and frictional drive portions which are, respectively, in driving engagement on correspondingly oriented arcuate sides of pulleys with the drive formations and smooth drive surface of said respective pulleys, idler means about which said belt is trained to effect said belt and pulley engagements as described, and means to simultaneously adjust the pitch diameter of said variable pitch pulley and bodily shift said idler means in a direction to maintain constant belt pressure on the pulleys, said last named means comprising an adjustable mount for said idler means, a rotary actuator operatively connected to said variable pitch pulley to regulate the width thereof, and a mechanism interconnecting said mount and actuator for simultanous adjustment.

References Cited in the file of this patent

UNITED STATES PATENTS

| | | |
|---|---|---|
| 1,806,901 | Hawley | May 26, 1931 |
| 2,073,668 | Wilson | Mar. 16, 1937 |
| 2,201,357 | Twomley | May 21, 1940 |
| 2,211,986 | Pfleger | Aug. 20, 1940 |
| 2,507,852 | Case | May 16, 1950 |
| 2,514,429 | Waugh | July 11, 1950 |
| 2,548,316 | Locke | Apr. 10, 1951 |
| 2,831,359 | Carle | Apr. 22, 1958 |

FOREIGN PATENTS

| | | |
|---|---|---|
| 285,244 | Germany | Apr. 12, 1914 |